March 25, 1958 G. HILDEBRAND 2,828,094
AIRCRAFT CANOPY AND ACTUATING MECHANISM
Filed Feb. 11, 1954 4 Sheets-Sheet 1
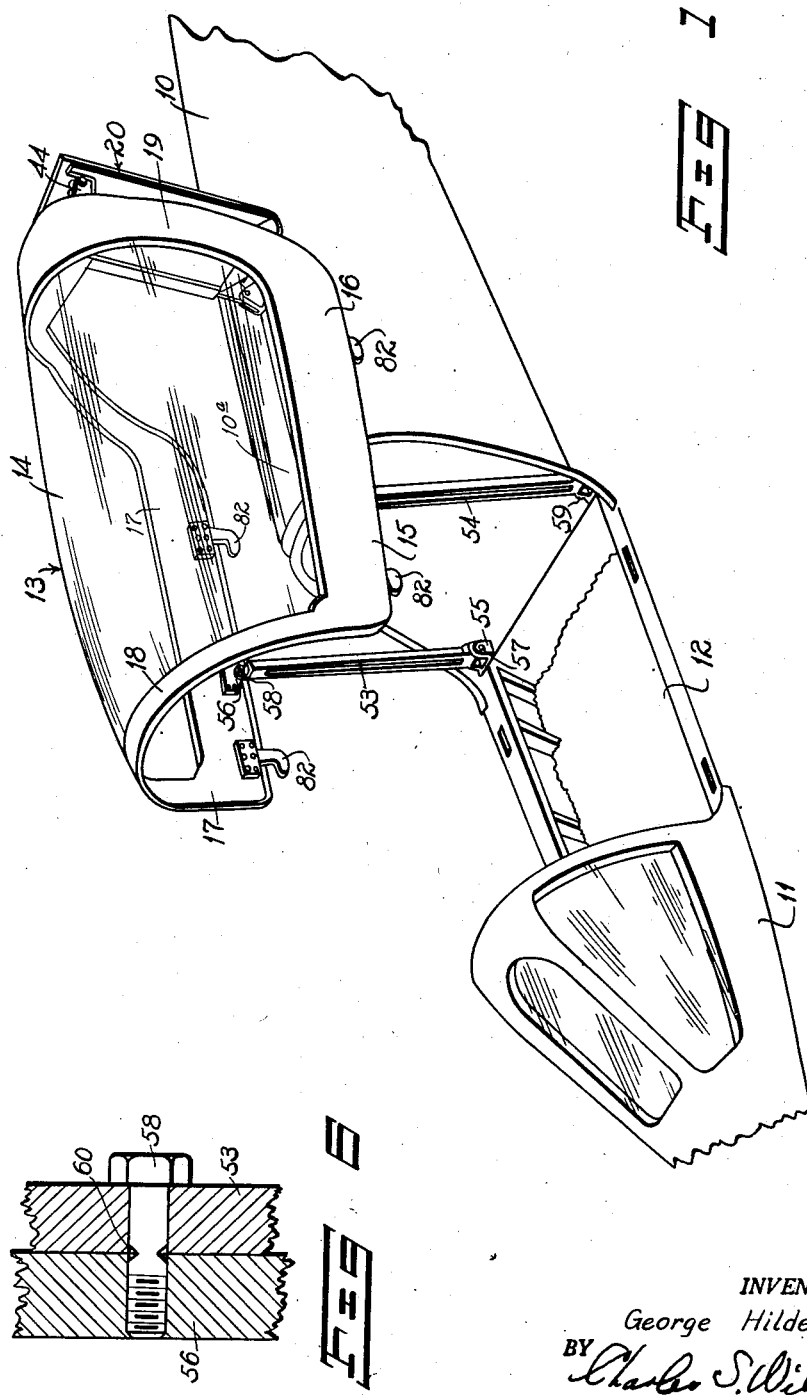
INVENTOR.
George Hildebrand
BY
ATTORNEY.

March 25, 1958 G. HILDEBRAND 2,828,094
AIRCRAFT CANOPY AND ACTUATING MECHANISM
Filed Feb. 11, 1954 4 Sheets-Sheet 2
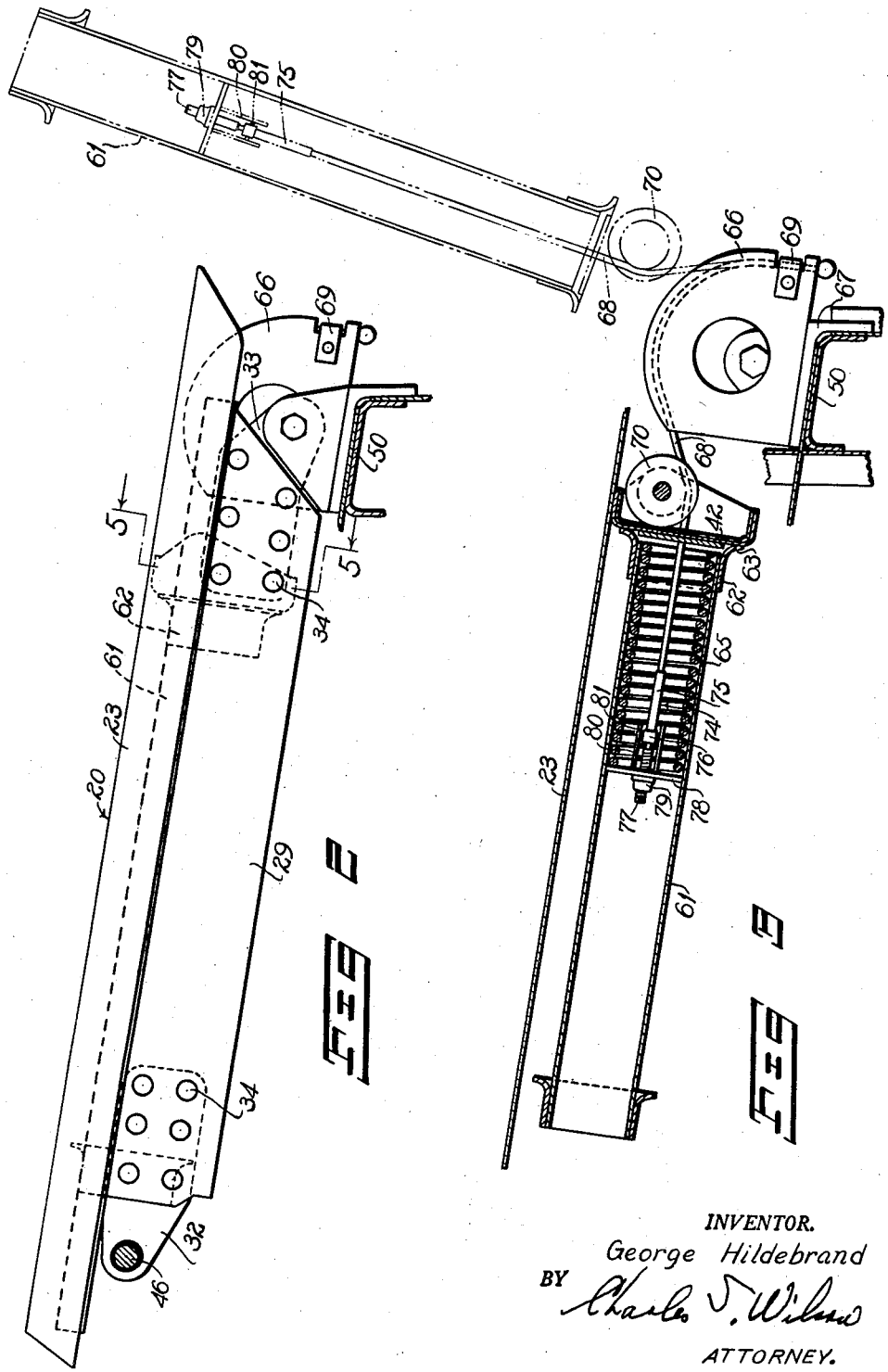
INVENTOR.
George Hildebrand
BY
ATTORNEY.

March 25, 1958 G. HILDEBRAND 2,828,094
AIRCRAFT CANOPY AND ACTUATING MECHANISM
Filed Feb. 11, 1954 4 Sheets-Sheet 3

INVENTOR.
George Hildebrand
BY
ATTORNEY.

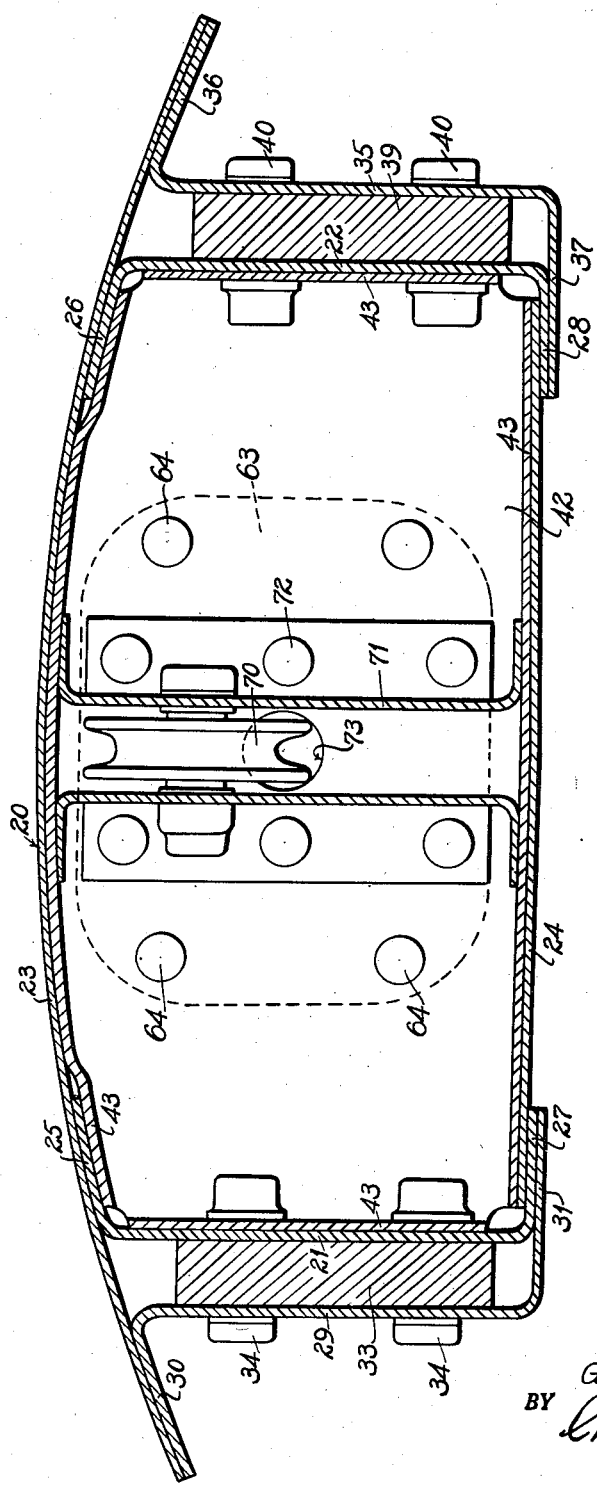

2,828,094

AIRCRAFT CANOPY AND ACTUATING MECHANISM

George Hildebrand, Forest Hills, N. Y., assignor to Republic Aviation Corporation, Suffolk County, N. Y., a corporation of Delaware Application February 11, 1954, Serial No. 409,687

10 Claims. (Cl. 244—121)

This invention relates in general to closures and more particularly has to do with a closure or canopy for the cockpit of an airplane and the means for moving it between its closed and opened positions.

Among other objects the present invention contemplates a canopy having means for pivotally mounting it on the airplane for movement relative to and longitudinally of the fuselage whereby the canopy may be quickly, easily, and positively moved between positions where it is disposed over and closes the cockpit or where it is disposed substantially aft of the cockpit to permit access thereto.

In addition, the canopy mounting means are so organized and arranged as to permit the canopy to be jettisoned or removed under emergency flight conditions while the mounting means remain connected to the aircraft so as to be available for future use in mounting a new canopy to the aircraft in the event such future use is possible.

With the above and other objects in view, as will be apparent, this invention consists in the construction, combination and arrangement of parts all as hereinafter described, claimed and illustrated in the accompanying drawings, wherein:

Fig. 1 is a fragmentary perspective view of the fuselage and cockpit of an airplane having the subject canopy and mounting means associated therewith;

Fig. 2 is a side elevation of the main or power arm and the mounting means thereof showing the same in the position assumed thereby when the canopy is in its closed position over the cockpit;

Fig. 3 is a fragmentary longitudinal section through the power arm showing the position of the elements thereof in solid lines when the canopy is disposed over the cockpit and in phantom lines when the canopy is disposed aft of the cockpit;

Fig. 5 is a section taken along lines 5—5 of Fig. 2, and

Fig. 6 is a cross-sectional view of one of the pivotal connections between the canopy and a guide arm.

Figure 4:
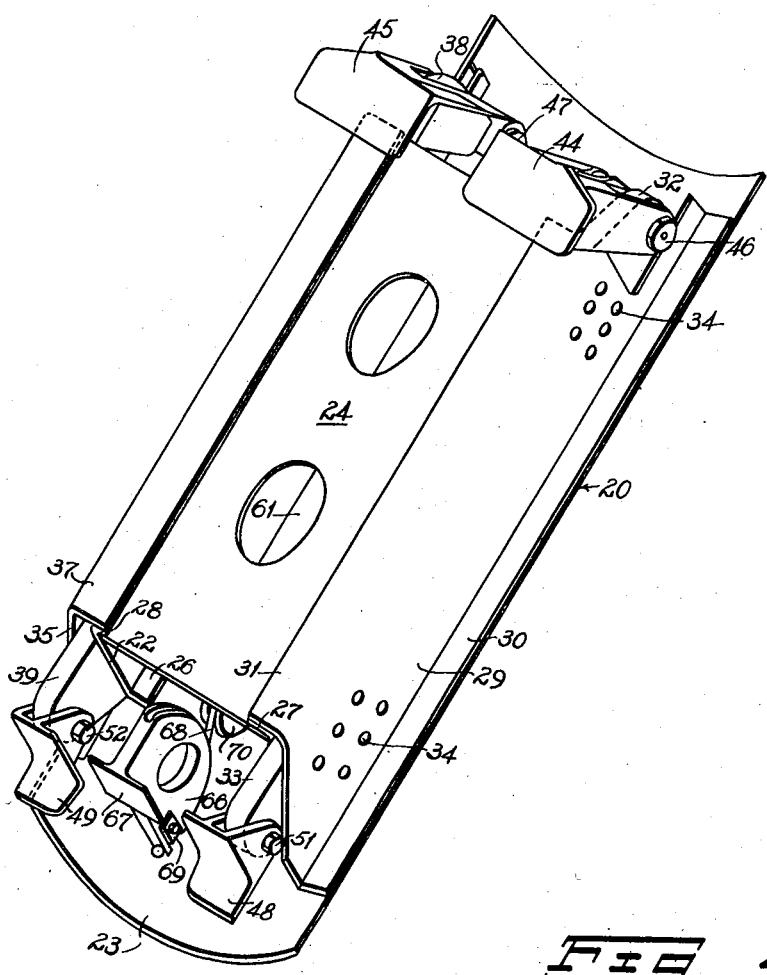
Fig. 4 is a perspective of the main or power arm showing the same connected to hinge fittings carried by the canopy and cockpit.

With the advent of high speed airplanes, particularly of the military type which customarily have relatively high take-off and landing speeds, it has become necessary to maintain the canopy of the cockpit in the closed position thereof during most of the time that the airplane is in motion. Thus, during the take-off, flight and landing of the airplane the canopy is maintained in its closed position over the cockpit and is moved to its open position only during the time the airplane is taxiing slowly or is stationary on the ground, or in the event emergency flight conditions necessitate the pilot to "bail out" or abandon the airplane. Further, it has been found that a pilot will very often jettison the canopy of his airplane and then decide to land the airplane. For example, a pilot may jettison the canopy upon the initial warning of a fire detecting and extinguishing system and then, upon the successful operation of the system, decide to remain with the airplane and land it.

As a result of the above, it has been proposed to replace the complicated and cumbersome reciprocating type canopy heretofore in use with a relatively simpler type canopy that is pivotally mounted to the aircraft to be swung between its closed and opened positions and which has its mounting and actuating means so organized and arranged that the major portion thereof remains with the airplane in the event the canopy is jettisoned. An exemple of a canopy so mounted is shown and described in the co-pending application of Richard D. Kaplan, Serial No. 409,298 filed February 10, 1954 and assigned to Republic Aviation Corporation.

The instant invention has in view the provision of an improved pivotally mounted canopy and to that end contemplates a canopy mounting and actuating means that is of relatively simple and light-weight construction and wherein the mounting and actuating means are adapted to remain with the aircraft in the event the canopy is jettisoned. For that purpose the canopy mounting means consists of a plurality of arms extending between the canopy and the airplane structure defining the cockpit and so constructed and arranged as to afford pivotal movement of the canopy longitudinally of the fuselage and relative to the cockpit between positions where the canopy is disposed over the cockpit to close it and where the canopy is disposed generally aft of the cockpit to permit access thereto. These arms include a main or power arm pivotally connected between the central rear or aft portion of the canopy and the aircraft structure aft of the cockpit and which is constructed to bear substantially all the load of the canopy, plus any aerodynamic loads imposed thereon during its pivotal movement, and a pair of guide arms disposed on opposite sides of the canopy and cockpit and pivotally connected to both the canopy and cockpit structure.

To facilitate the movement of the canopy between its closed and opened positions, the main or power arm has counter-balancing means associated therewith that imposes varying loads on the canopy to minimize the force required to move the canopy and which also serves to dampen or retard the movement of the canopy as it nears its position over and closing the cockpit.

The pivotal connections between the arms and canopy are designed to withstand the loads imposed thereon during the normal pivotal movement of the canopy as it is swung between its closed and opened positions but which disconnect the canopy from the arms in the presence of abnormal loads, thereby permitting the jettisoning of the canopy without loss of the mounting means.

Referring now to the drawings and more particularly to Fig. 1 thereof, 10 designates the upper, medial part of the fuselage of an airplane having a conventional windshield assembly 11 disposed forwardly of a pilot's cockpit 12. A canopy assembly 13 comprising a transparent body 14 that is suitably mounted in a frame 15 is associated with the cockpit 12. The frame 15 has left and right edge or skirt portions 16 and 17 respectively, that extend between the fore and aft bowed ends 18 and 19 respectively of the canopy and engage the cockpit structure when the canopy is disposed over the cockpit. The cockpit 12 and canopy 13 are both symmetrically disposed with respect to the longitudinal axis of the fuselage 10.

To support the canopy 13 for pivotal movement relative to cockpit 12 and the fuselage 10 between a position where it is disposed over and closes the cockpit and a position where it is disposed generally aft of the cockpit to permit access thereto, a main support or power arm 20 is pivotally mounted at one of its ends to the structure of fuselage 10 aft of cockpit 12 and at the opposite end thereof to aft end 19 of the canopy. As shown more particularly in Figs. 4 and 5, the arm 20 comprises a box girder formed by two channel members 21 and 22 that are substantially U-shaped in cross-section and which are held in spaced, parallel relationship to each other by top and bottom webs 23 and 24 that are suitably secured to the outer surfaces of upper flanges 25 and 26 and the inner surfaces of lower flanges 27 and 28 of channels 21 and 22, respectively. For purposes that will hereinafter become apparent, top web 23 also forms a part of the skin or outer surface of fuselage 10 aft of cockpit 12.

The longitudinal edges or sides of web or skin 23 project outwardly beyond the limits of the sides of channel members 21 and 22. A beam 29, substantially Z-shaped in cross-section is suitably secured by the flange 30 thereof to the portion of web 23 projecting outwardly beyond the side of channel member 21 and by the flange 31 thereof to the outer surface of flange 27 of channel member 21 to reinforce this channel member. As shown in Figs. 4 and 5 the Z-beam 29 and channel member 21 are spaced from each other, and at their forward and aft ends hinge supports 32 and 33 are positioned between the beam 29 and channel member 21 to extend partially beyond the limits thereof and are secured thereto by suitable fastening means 34.

A second Z-beam 35 is mounted by the flange 36 thereof to the skin or web 23 extending outwardly beyond the side of channel member 22 and by its other flange 37 to the outer surface of flange 28 of channel member 22. Thus, the Z-beam 35 serves to reinforce channel member 22. Channel member 22 and Z-beam 35 are spaced from each other and at the forward and aft ends thereof hinge supports 38 and 39 are positioned between the beam and channel member to extend, in part, beyond the limits thereof, and are secured thereto by suitable fastening means 40.

To further reinforce arm 20 so that it is capable of withstanding relatively high loads, a plurality of transverse webs, only the aft one 42 of which is shown, are mounted internally of arm 20 and are secured by the peripheral flanges 43 thereof to channel members 21 and 22 and top and bottom webs 23 and 24, respectively.

To pivotally connect the forward end of arm 20 to canopy 13, the aft end 19 of the latter is provided with left and right hinge fittings 44 and 45, respectively, that are positioned on the inner side of end 19 and are equidistantly disposed on either side of the center line of the canopy so as to be disposed on either side of the longitudinal axis of fuselage 10. As shown in Fig. 4, the forwardly extending portions of hinge supports 32 and 38 are inserted between the bifurcated arms of fittings 44 and 45, respectively and hinge or pivot pins 46 and 47 pass through registered openings in fitting 44 and support 32 and fitting 45 and support 38, respectively, to pivotally connect the associated members to each other.

The aft end of arm 20 is similarly connected to the fuselage structure directly aft of cockpit 12 by hinge fittings 48 and 49 that are suitably secured to a transverse structural member 50 and disposed equi-distantly on opposite side of the longitudinal axis of fuselage 10. Hinge supports 33 and 39 are disposed between the bifurcated arms of fittings 48 and 49 respectively and connected thereto by their respective hinge pins 51 and 52.

Due to this construction and arrangement the central, vertical longitudinal plane of arm 20 is coincident with the central, vertical longitudinal plane of fuselage 10 and hence the cockpit 12 and the canopy 13. Moreover, arm 20 is adapted to pivot about hinge pins 51 and 52. Since, however, hinge fittings 48 and 49 are disposed internally of the fuselage 10 a portion of the skin of the aircraft equal in size and area to the upper web 23 is removed to form an opening or well 10a through or in the skin of the fuselage directly aft of cockpit 12 which opening or well receives and accommodates the pivotal movement of arm 20. To close the opening 10a when canopy 13 is in its closed position, hinge fittings 48 and 49 are so disposed relative to the outer surface or skin of the fuselage, that when arm 20 is pivoted on pins 51 and 52 to move the canopy 13 to its closed position, the outer surface of web 23 is disposed in opening or well 10a to form a flush continuation of the skin or outer surface of fuselage 10.

The mounting means for canopy 13 also includes a pair of guide arms 53 and 54 that are disposed on, and connected between, the right and left sides, respectively, of cockpit 12 and canopy 13. More particularly, the structure defining the right side of cockpit 12 has a bracket 55 mounted thereon adjacent the aft end thereof while a bracket 56 is suitably mounted to the inner side of right skirt 17 of canopy 13 medially of the length thereof and forwardly of bracket 55. Arm 53 is pivotally connected to these brackets 55 and 56 by pins 57 and 58 which pass through registered openings in brackets 55 and 56, respectively, and the associated end of arm 53. Arm 54 is connected in the same manner by pivot pins similar to pins 57 and 58 to brackets 59, mounted to the aft end of the left side of cockpit 12 and to a bracket similar to bracket 56 but not shown mounted to the inner side of left skirt 16 of canopy 13.

From the foregoing description of the construction of the canopy and the mounting means therefor, it is apparent that canopy 13 is mounted by arms 20, 53 and 54 for pivotal movement relative to cockpit 12. Moreover, during such pivotal movements, arm 20 bears substantially the entire load of the canopy in addition to any aerodynamic loads that might be imposed thereon, while the guide arms 53 and 54 serve to maintain the correct alignment between frame 15 of the canopy and the peripheral structure of cockpit 12 during the closing movement of the canopy.

Arms 20, 53 and 54 are so organized and arranged that when the canopy 13 is in its raised position, as shown in Fig. 1, the center of gravity of the canopy is so disposed that the canopy tends to move toward its closed position under the force of gravity. Therefore, suitable up-lock means, not shown, are associated with either the main arm 20 or guide arms 53 and 54 to maintain canopy 13 in its raised or opened position when so desired.

As hereinbefore set forth, the present invention contemplates means whereby canopy 13 may be jettisoned without concurrent loss of the mounting means. To this end, the pivot pins which connect arms 53 and 54 to the brackets carried by canopy 13 are each provided with shear sections 60, as shown in Fig. 6. Pivot pins 46 and 47 which connect the forward end of arm 20 to canopy 13 are also provided with similar shear sections, not shown. Thus, the pivot pins connecting arms 20, 53 and 54 to canopy 13 are designed to withstand the normal loads imposed thereon during the usual pivotal movement of canopy 13 to and from the closed and open positions thereof. However, under abnormal load conditions, such as would be produced by the airstream acting on the inner surface of the canopy should the forward edge thereof be raised slightly above the surface of the fuselage during flight, these pins shear at their respective shear sections 60 to disconnect the canopy from arms 20, 53 and 54. Due to this construction and arrangement, when the canopy 13 is jettisoned, the arms 20, 53 and 54 remain with the aircraft so as to be available for future use.

To facilitate the swinging pivotal movement of canopy 13 and to minimize the effort required to accomplish this movement, a power or counter-balancing mechanism is associated with arm 20. As shown more particularly in Figs. 2, 3 and 4, a cylindrical or tubular housing 61, having a mounting member 62 at its rear or aft end, is mounted by the flange 63 thereof and suitable fastening means such as rivets 64 to the inner or forward side of transverse web 42. This housing 61, therefore, extends forwardly into and is symmetrically disposed in the vertical longitudinal plane of arm 20. A spring 65 is mounted in housing 61 and is guided through its longitudinal movements by the inner wall of the housing. A grooved cam 66 is secured by an integral flange 67 to the structural member 50 of the fuselage 10 between the hinge fittings 48 and 49 and is positioned to be symmetrically disposed in the vertical, longitudinal plane of arm 20 and in axial alignment with spring 65.

A cable 68, secured at one of its ends by a clip 69 to the rear portion of grooved cam 66 passes over the cam and is reeved over a pulley 70. This pulley 70 is mounted in brackets 71 secured by rivets 72 to the rear or aft surface of transverse web 42. From pulley 70, cable 68 passes through a central opening 73 in transverse web 42 and through the spring 65 where its opposite end is connected to a turnbuckle assembly 74.

Turnbuckle assembly 74 consists of a bolt 75 having the cable 68 connected to one end, a swivel joint 76 medially of its length and a threaded end 77 that passes through the central aperture in a circular washer 78. Washer 78 is slideably mounted in housing 61 and has one side thereof bearing against the forward end of spring 65. A nut 79 engages the threaded end 77 of bolt 75 and bears against the surface of the washer 78 in opposition to the surface thereof abutting spring 65. The washer 78 is provided with guides 80 that extend inwardly into the interior of spring 65 and which cooperate with fingers 81 carried by turnbuckle 76 to prevent rotation of the end of bolt 75 to which cable 68 is secured upon the rotation of nut 79.

The grooved cam 66 and cable 68 are so arranged that when power arm 20 is in the position it assumes when the canopy is in the opened or raised position thereof, see Fig. 3, cable 68 is almost completely unwrapped or free from the cam 66 and spring 65 is permitted to fully expand. However, as canopy 13 is moved to the closed position thereof, the pivotal movement of arm 20 wraps cable 68 about cam 66 thereby causing cable 68 to compress spring 65 and place it under tension.

The compression of spring 65 imposes a load on canopy 13 that acts in opposition to gravity moving the canopy toward its closed position. Thus, spring 65 is effective to dampen or retard the forward pivotal movement of the canopy and thereby prevent it from slamming into its closed position. Moreover, since the compression of spring 65 progressively increases as the canopy approaches cockpit 12, the load imposed by it on the canopy increases as the closed position is approached.

When canopy 13 is in its closed position and spring 65 fully compressed, the load imposed by the spring tends to move the canopy toward its raised position. Such movement is prevented by conventional canopy downlock means (not shown) carried by the fuselage 10 with engage hooks 82 carried by skirts 16 and 17 of canopy 13. Therefore, when the canopy locking means are released, the force or load produced by fully compressed spring 65 assists in moving the canopy toward its raised or open position. During the raising of canopy 13, cable 68 unwraps from cam 66, permitting spring 65 to expand and thus progressively decreasing the force imposed thereby on canopy 13.

The load or force imposed by spring 65 may be varied by rotating nut 79 to adjust the effective length of cable 68 and thereby determine the degree of compression of spring 65 by the cable.

Having thus described the details of construction, arrangement and operation of the canopy and mounting means therefor contemplated herein, it will be apparent to one skilled in the art that various objects of the present invention heretofore set forth have been accomplished. Moreover, it is understood that various changes and modifications may be made in the arrangement and construction of the various elements of the instant invention which now will be apparent to those skilled in the art without departure from the scope thereof.

What is claimed is:

1. The combination with an airplane cockpit, of a canopy constructed and arranged for association with said cockpit, a support arm pivotally connected at its opposite ends adjacent to the aft extremities of said canopy and said cockpit for mounting and supporting said canopy for pivotal movement relative to the cockpit between a position over and enclosing the cockpit and a position away from and above and to the rear of the cockpit, said support arm being constructed and arranged to carry substantially all of the loads on said canopy during the pivotal movement thereof, a pair of spaced guide arms disposed on opposite sides of said canopy and cockpit and pivotally connected at their opposed ends to the canopy and the cockpit to guide said canopy during its pivotal movement, and means associated with said support arm and said cockpit for assisting the pivotal movement of said canopy.

2. The combination with an airplane cockpit, of a canopy constructed and arranged for association with said cockpit, a support arm pivotally connected at its opposite ends adjacent to the aft extremities of said canopy and said cockpit for mounting and supporting said canopy for pivotal movement relative to the cockpit between a position over and enclosing and a position away from and above and to the rear of the cockpit, said support arm bearing substantially all of the load of said canopy during its pivotal movements, and a pair of spaced guide arms disposed on opposite sides of said canopy and cockpit and pivotally connected at their opposed ends to the canopy and the cockpit to guide said canopy during its pivotal movement.

3. In combination, an airplane fuselage having a cockpit, a canopy adapted for association with said cockpit, hinge means carried by said fuselage aft of said cockpit, hinge means carried by the aft end of said canopy, an arm interposed between said fuselage and canopy and pivotally connected at its ends to the hinge means of each for mounting and supporting said canopy for pivotal movement relative to said cockpit, spring means carried by said arm, and operating means disposed between and connected to said fuselage and said spring means whereby the latter is loaded when the canopy moves in one direction to thereby assist in its movement in the opposite direction.

4. In combination, an airplane fuselage having a cockpit, a canopy, an arm pivotally mounted at one of its ends to said fuselage and at its opposite end pivoted to the canopy for mounting and supporting said canopy for movement relative to said cockpit to open or close the same, said fuselage having a well in its outer surface to accommodate the pivotal movement of said support arm and to contain the support arm when the canopy encloses the cockpit, and means carried by the arm to close said well and form a flush continuation of the fuselage surface when said canopy is positioned to enclose said cockpit.

5. In combination, an airplane fuselage including a cockpit, a canopy adapted for association with said cockpit, a support arm pivotally connected at its opposite ends to the aft end of the canopy and to the fuselage aft of said cockpit for mounting and supporting said canopy for swinging movement between positions where it is disposed over said cockpit to close the same and where it is disposed above and to the rear of the cockpit to permit access thereto, said support arm comprising the principal support for said canopy during its swinging movements as aforesaid, and a pair of guide arms, each pivoted at its ends to corresponding sides of the cockpit and canopy to guide said canopy relative to said cockpit during its swinging movement.

6. The combination comprising an airplane fuselage having a cockpit, a canopy for association with said cockpit, a pair of spaced hinge fittings mounted interiorly of said fuselage aft of said cockpit, a pair of spaced hinge fittings mounted on the aft end of said canopy, an arm pivotally connected at its opposite ends to said spaced hinge fittings on said fuselage and canopy for mounting and supporting said canopy for swinging movement relative to said cockpit to occupy either of two positions, said arm being adapted to carry substantially all of the loads imposed on said canopy during its swinging movements, said fuselage having a well formed in the exterior surface thereof aft of the cockpit to accommodate the pivotal movement of and on occasion contain said arm, a member carried by said arm and adapted to be disposed in and close said well to form a flush continuation of the exterior surface of the fuselage when said canopy is in one of its two positions and said arm is contained in said well, and means interposed between said canopy and fuselage for dampening the movement of the canopy as it approaches one position and to assist in its movement in the opposite direction.

7. The combination comprising an airplane fuselage having a cockpit, a canopy for association with said cockpit, a pair of hinge fittings mounted interiorly of said fuselage aft of said cockpit, a pair of hinge fittings mounted on the aft portion of said canopy, an arm pivotally connected at its opposite ends to said hinge fittings on said fuselage and canopy for supporting said canopy for swinging movement relative to said cockpit to occupy a first position to enclose said cockpit and a second position above and to the rear of said cockpit to permit access thereto, said fuselage having a well formed in the exterior surface thereof aft of the cockpit to accommodate the pivotal movement of and on occasion contain said arm, a member carried by said arm and adapted to be disposed in and close said well to form a flush continuation of the exterior surface of the fuselage when said canopy is in one of its two positions and said arm is contained in said well, and means associated with said arm for dampening the movment of said canopy as it approaches one position and to assist in its movement in the opposite direction.

8. In combination, an airplane fuselage having a cockpit, a canopy constructed and arranged for association with said cockpit, an arm interposed between said canopy and fuselage pivotally connected at its ends thereto for supporting said canopy for swinging movement relative to said cockpit between a first position where said canopy is disposed over and encloses said cockpit and a second position where said canopy is generally disposed over and above the fuselage aft of the cockpit, spring means carried by said arm, a cam mounted on said fuselage, a cable secured at one end to said cam and at its opposite end to said spring means, said cable being substantially free of the cam when said canopy is disposed generally above and aft of the cockpit and being progressively engaged by said cam to load said spring means as said canopy moves to its position enclosing the cockpit.

9. The combination with a fuselage having a cockpit and a canopy for enclosing said cockpit, of means mounting said canopy for swinging movement in two directions relative to said cockpit between a position where said canopy is disposed over and encloses said cockpit and a position where said canopy is disposed above and to the rear of said cockpit, resilient means carried by said mounting means, a cam fixedly secured to said fuselage, and cam actuated means connected to said resilient means and said cam and effective to progressively load said resilient means to thereby dampen the movement of said canopy as it moves in one of said two directions and whereby said loaded resilient means assists the movement of said canopy in the other of said two directions.

10. The combination comprising an aircraft fuselage having a cockpit, a canopy for association with said cockpit, a pair of hinges mounted interiorly of said fuselage aft of said cockpit, a pair of hinge fittings mounted on the aft end of said canopy, an arm pivotally connected at its opposite ends to said hinge fittings on said fuselage and canopy thereby mounting and supporting said canopy for pivotal movement relative to said cockpit to occupy either of two positions, said fuselage having a well aft of the cockpit to accommodate the pivotal movement of and on occasion contain said arm, a closure carried by said arm and adapted to be disposed in and close said well to form a flush continuation of the exterior surface of the fuselage when said canopy is in one of its two positions and said arm is contained in said well, resilient means carried by said arm, a cam mounted on said fuselage adjacent the aft end of said cockpit, and means connected to said resilient means and operative over said cam to progressively compress and load said resilient means and thereby retard the movement of said canopy as it approaches one of said two positions and to assist its movement toward the other of said two positions.

References Cited in the file of this patent

UNITED STATES PATENTS

| | | |
|---|---|---|
| 1,799,555 | Grumman | Apr. 7, 1931 |
| 2,108,289 | Laddon | Feb. 15, 1938 |
| 2,479,713 | Beach | Aug. 23, 1949 |
| 2,533,548 | Backer | Dec. 12, 1950 |
| 2,673,050 | Patch et al. | Mar. 23, 1954 |

FOREIGN PATENTS

| | | |
|---|---|---|
| 465,733 | Great Britain | May 13, 1937 |
| 467,153 | Great Britain | June 7, 1937 |

OTHER REFERENCES

"Flight" Magazine, page 153, February 11, 1943.